(12) United States Patent
Challener et al.

(10) Patent No.: US 8,499,345 B2
(45) Date of Patent: Jul. 30, 2013

(54) BLOCKING COMPUTER SYSTEM PORTS ON PER USER BASIS

(75) Inventors: David Carroll Challener, Raleigh, NC (US); Howard Jeffrey Locker, Cary, NC (US); Joseph Michael Pennisi, Apex, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 782 days.

(21) Appl. No.: 12/243,762

(22) Filed: Oct. 1, 2008

(65) Prior Publication Data

US 2010/0083366 A1 Apr. 1, 2010

(51) Int. Cl.
*G06F 21/00* (2006.01)

(52) U.S. Cl.
USPC .......... 726/17; 726/4; 726/5; 726/21; 726/27; 726/28; 713/1; 713/2; 713/183; 709/222; 718/1; 718/104

(58) Field of Classification Search
USPC ....... 709/222; 713/2, 200, 201, 183, 1; 726/4, 726/5, 17, 21, 27, 28; 718/1, 104
See application file for complete search history.

(56) References Cited

U.S. PATENT DOCUMENTS

| | | | | |
|---|---|---|---|---|
| 7,003,676 B1* | 2/2006 | Weber et al. | | 713/194 |
| 7,814,021 B2* | 10/2010 | Stamos et al. | | 705/57 |
| 2004/0109017 A1* | 6/2004 | Rothman et al. | | 345/735 |
| 2005/0138348 A1* | 6/2005 | Bolay et al. | | 713/100 |
| 2006/0037074 A1* | 2/2006 | Yang | | 726/17 |
| 2006/0037084 A1* | 2/2006 | Brown et al. | | 726/28 |
| 2006/0064577 A1* | 3/2006 | Chiu et al. | | 713/2 |
| 2007/0005949 A1* | 1/2007 | Ho et al. | | 713/2 |
| 2007/0162909 A1* | 7/2007 | Bahl et al. | | 718/104 |
| 2008/0163208 A1* | 7/2008 | Burr et al. | | 718/1 |
| 2008/0163360 A1* | 7/2008 | Nishida | | 726/17 |
| 2008/0270780 A1* | 10/2008 | Lopez et al. | | 713/1 |
| 2008/0271122 A1* | 10/2008 | Nolan et al. | | 726/4 |
| 2009/0183256 A1* | 7/2009 | Mo et al. | | 726/21 |

FOREIGN PATENT DOCUMENTS

| | | |
|---|---|---|
| CN | 1487412 | 4/2004 |
| CN | 101094097 A | 6/2006 |

OTHER PUBLICATIONS

"Method of protecting safety of computer network," English abstract of CN1487412 (item 'AM' above), supplied by esp@cenet database.

* cited by examiner

*Primary Examiner* — Brandon Hoffman
*Assistant Examiner* — Hee Song
(74) *Attorney, Agent, or Firm* — John L. Rogitz; John M. Rogitz

(57) ABSTRACT

An approach is provided that receives a user identifier from a user of the information handling system. The user identifier can include a username as well as a user authentication code, such as a password. Hardware settings that correspond to the user identifier are retrieved from a nonvolatile memory. Hardware devices, such as ports (e.g., USB controller), network interfaces, storage devices, and boot sequences, are configured using the retrieved hardware settings. After the hardware devices have been configured to correspond to the identified user, an operating system is booted.

21 Claims, 7 Drawing Sheets

BLOCKING COMPUTER SYSTEM PORTS ON PER USER BASIS

BACKGROUND OF THE INVENTION

1. Technical Field

The present invention relates to an approach for blocking computer system ports based on the user of the system. More particularly, the present invention operates to load NVRAM (CMOS) settings that control hardware functionality based on the user of the system.

2. Description of the Related Art

An individual computer systems is often used by multiple users. Each of the users of the system might have different responsibilities and different trust levels in an organization. Computer systems are often networked within an organization and can access the organization's confidential information either through the network or stored on the computer system's nonvolatile storage devices, such as the hard drive. Ports, such as Universal Serial Bus (USB) ports, are often used to connect portable nonvolatile storage devices (e.g., "thumb drives," "USB drives," etc.) to computer systems to either copy data from the computer system to the portable device or to write data from the devices to the computer system's hard drive. Data copied to the computer system may include executables, such as programs, that could inadvertently, or deliberately, contain malware, such as viruses, that could not only infect the individual computer system, but could also infect or disrupt other computer systems in the organization through the computer network.

Traditional access control mechanisms, such as operating systems that provide a "profile" for individual users, are often used to limit individual's access to sensitive data or files and may even provide such data on a "need to know" basis. However, these traditional access control mechanisms are challenged in that ports that allow inputs and outputs are controlled using nonvolatile RAM (NVRAM) settings (e.g., CMOS settings) that are established before the operating system has booted. In traditional systems each of the users shares the same CMOS settings. Therefore, these NVRAM settings are usually configured with one or more "open" ports so that users of the system can send and receive data from the computer system. This "open" setting may be necessary and appropriate for a trusted individual of the organization that needs to be able to load files to the system or copy files to a portable device. However, a non-trusted individual, such as a new temporary worker, also receives these "open" settings and, as described above, can compromise the security and integrity of the computer system and organizational networks by using such "open" ports to steal confidential data or to load "malware" on the computer system's hard drive.

SUMMARY

It has been discovered that the aforementioned challenges are resolved using an approach that receives a user identifier from a user of the information handling system. The user identifier can include a username as well as a user authentication code, such as a password. Hardware settings that correspond to the user identifier are retrieved from a nonvolatile memory. Hardware devices, such as ports (e.g., USB controller), network interfaces, storage devices, and boot sequences, are configured using the retrieved hardware settings. After the hardware devices have been configured to correspond to the identified user, an operating system is booted.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
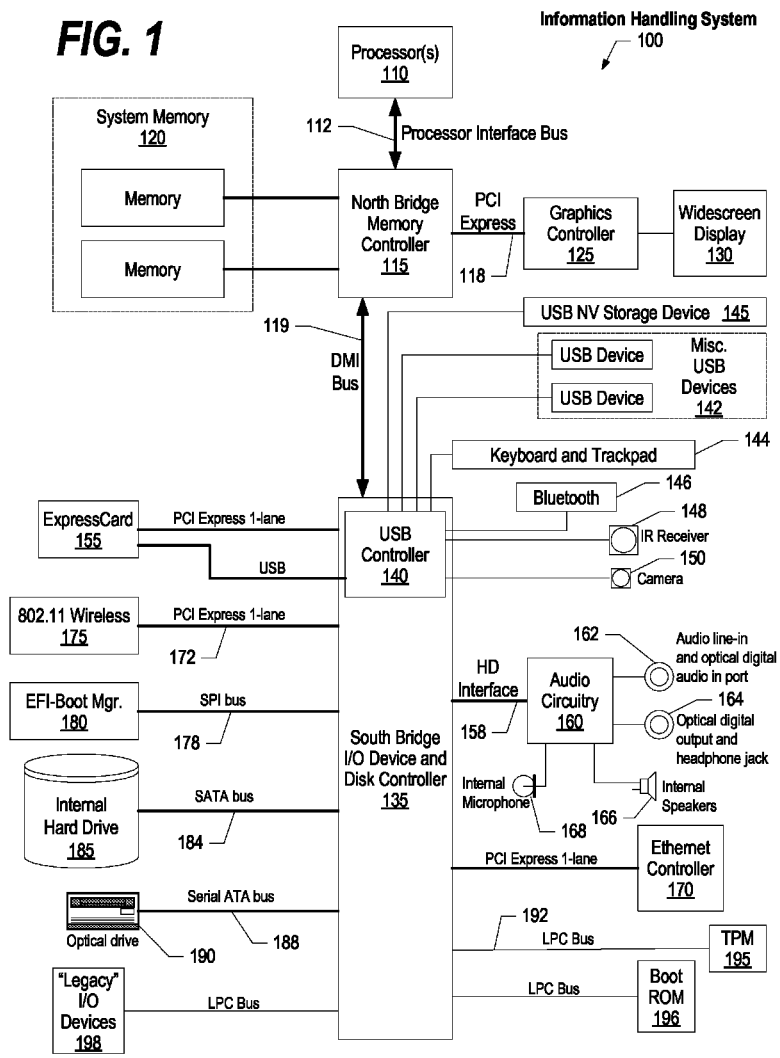
FIG. 1 is a block diagram of a data processing system in which the methods described herein can be implemented.
Figure 2:
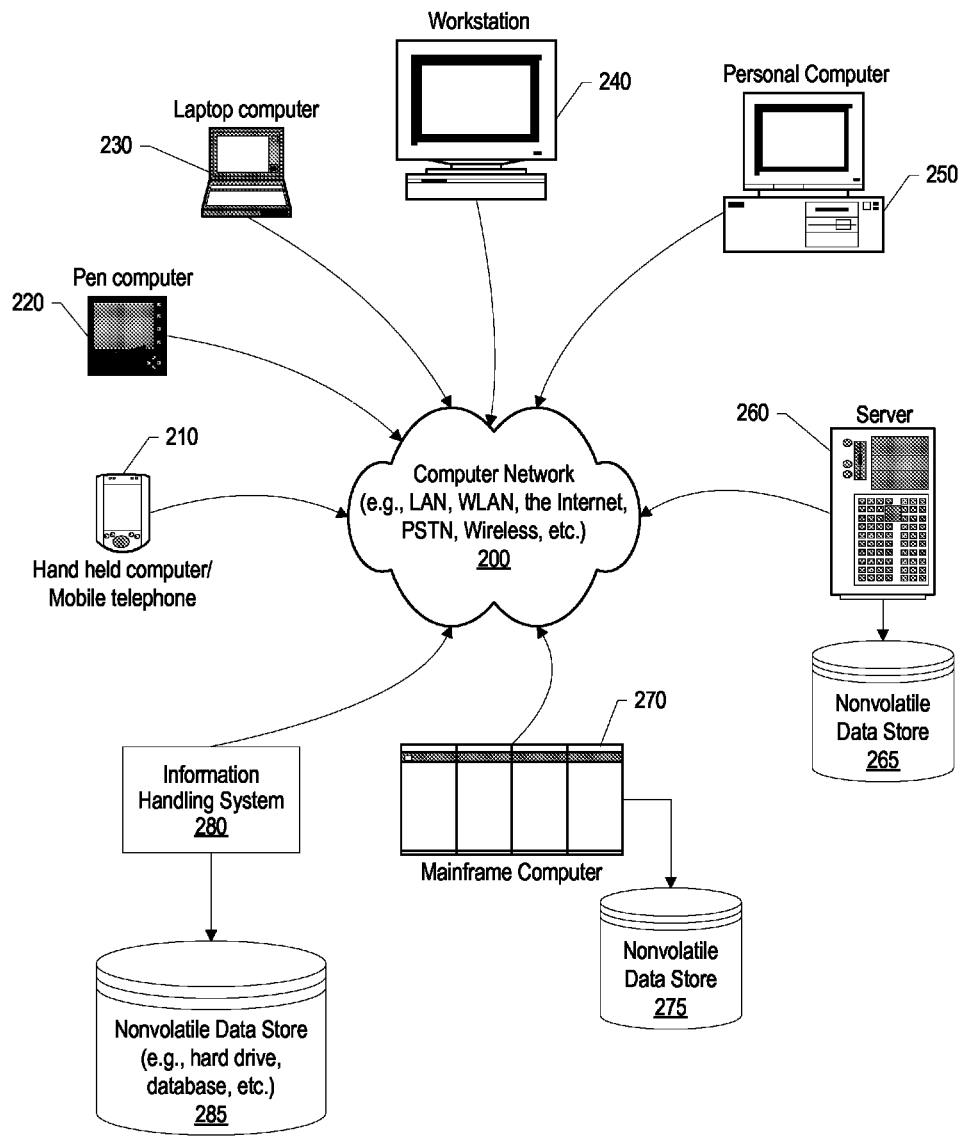
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to a nonvolatile storage device 185 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a disk drive, such as disk drive 185.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
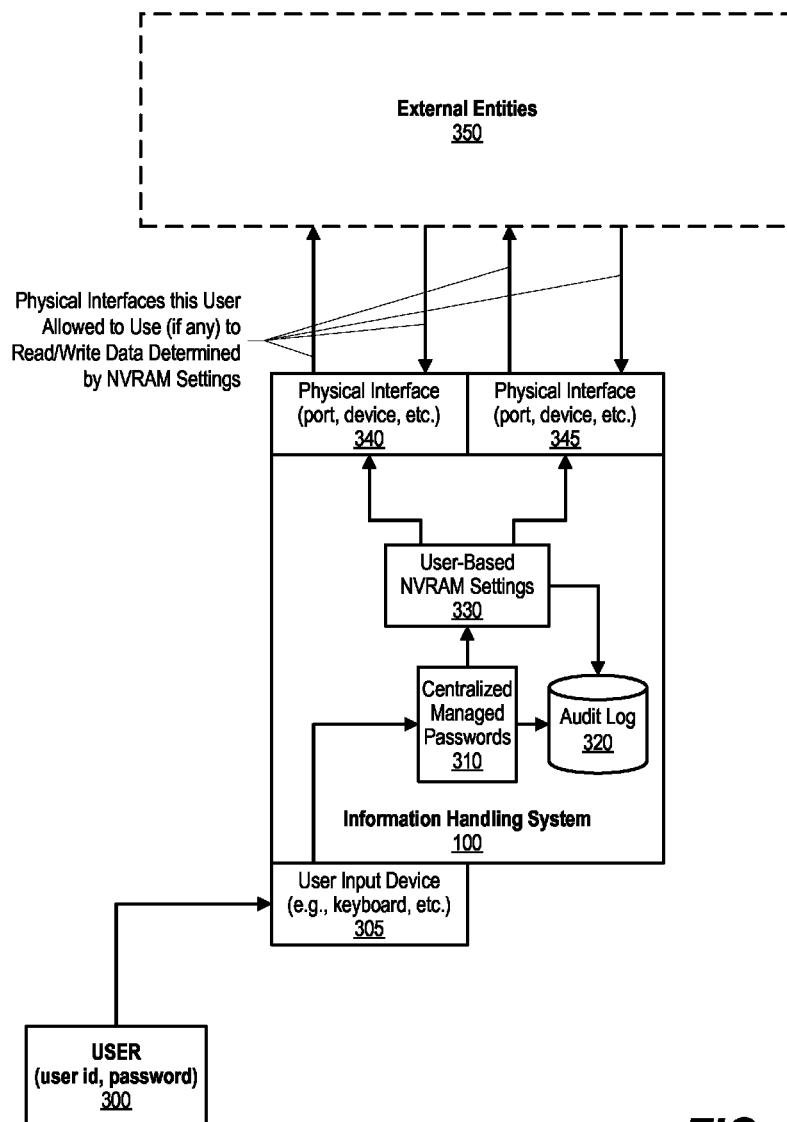
FIG. 3 is a block diagram showing ports and devices being configured using user-based nonvolatile RAM (NVRAM) settings.

FIG. 3 is a block diagram showing ports and devices being configured using user-based nonvolatile RAM (NVRAM) settings. User 300 uses user input device 305, such as a keyboard attached to the information handling system, to provide identification data to the information handling system. This identification data can include a username and password, biometric data, or other data used to uniquely identify the user of the information handling system. Centralized managed password (CMP) system 310 is used to authenticate the user to the information handling system. This identification data is also used by user-based nonvolatile RAM (NVRAM) settings process 330 to determine the configuration of hardware devices for this particular user. For example, for one identified user, such as a trusted user, ports (e.g., USB ports, network interface ports, etc.) can be enabled, while the same ports can be disabled for a less-trusted user or for a user that does not need to utilize the ports. In addition, audit log 320 is maintained to keep track of which users have accessed the system as well as what device configuration settings were in place while the user was using the system. In one embodiment, the audit log is kept in a secure location, such as an encrypted file location, to prevent users from tampering with the data stored in the audit log. The user-based NVRAM settings process makes configuration data available to hardware controllers and other hardware devices (340 and 345) that determine whether the device is enabled or disabled for this particular user. In addition, the user-based NVRAM settings process can also be used to establish a boot sequence for a particular user. The boot sequence can be set so that a trusted user can boot using a CD-ROM or other removable media (e.g., diskette, etc.), while the less-trusted user can be forced to boot using one particular boot sequence (e.g., only being able to boot the operating system located on a primary nonvolatile storage device, such as the primary hard drive).

The configuration of hardware controllers and hardware devices is used to block or enable communication with external entities 350. For example, when the USB controller is blocked for a less-trusted user, communication with USB drives is blocked. External entities can include computer networks by disabling (fully or partially) a network interface device. External entities can also include nonvolatile storage devices. For example, a secondary nonvolatile storage device can be included in the information handling system and used to store confidential, or sensitive data. The drive controller used to access this secondary storage device can be enabled for users that are allowed to view the data and the drive controller can be disabled when a user that is not allowed to view the data is using the computer system.

Figure 4:
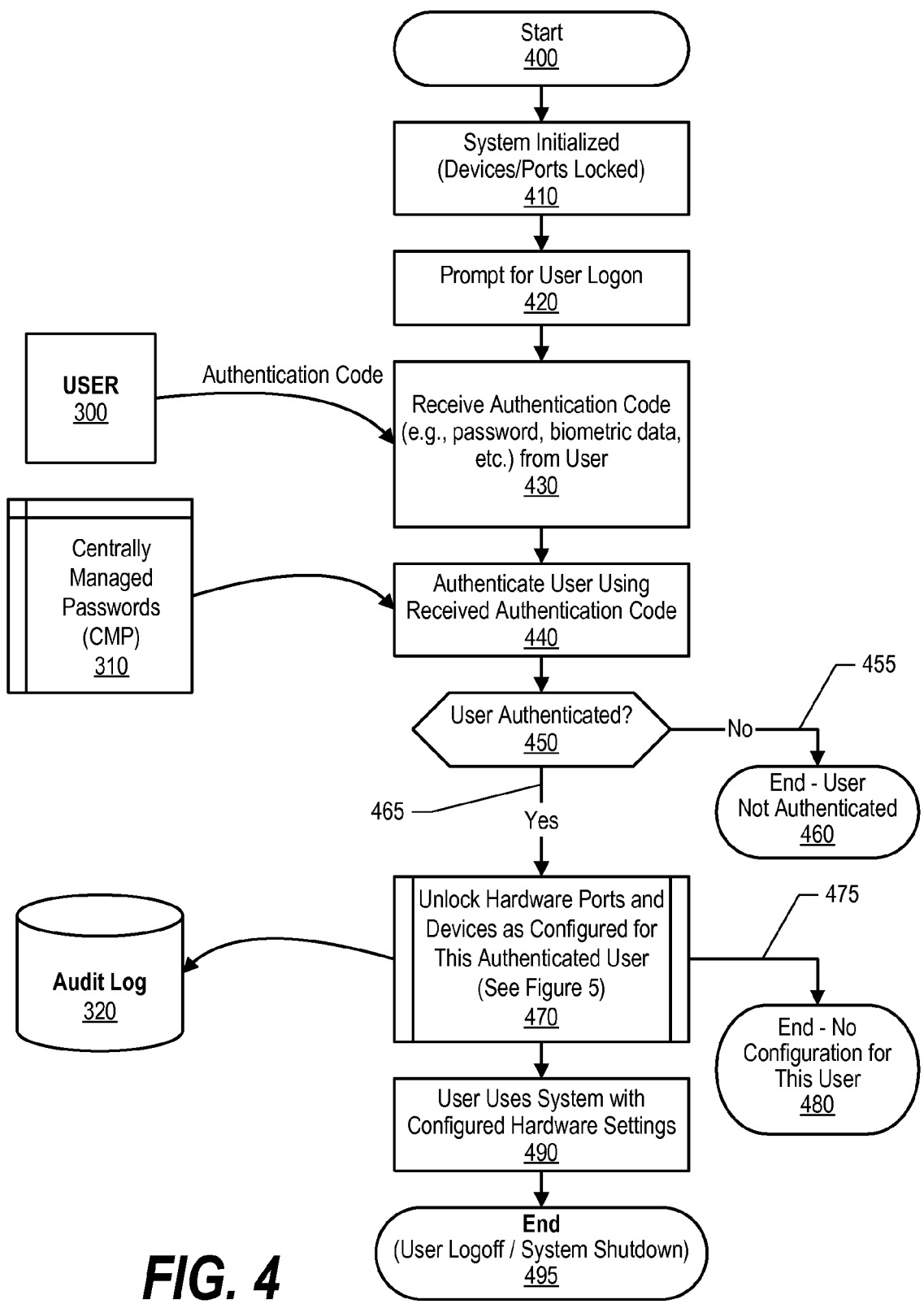
FIG. 4 is a flowchart showing the startup of an information handling system utilizing user-based device control.

FIG. 4 is a flowchart showing the startup of an information handling system utilizing user-based device control. Processing commences at 400 whereupon, at step 410, the system is initialized (e.g., turned on, rebooted, etc.) at which time any non-essential devices and ports that are not needed for preboot processing are disabled. At step 420, the login sequence prompts the user for logon information (e.g., username/password, biometric data, etc.). At step 430, an authentication code (e.g., username/password, biometric data, etc.) is received from user 300 by using a user input device, such as a keyboard, thumbprint reader, etc.

At step 440, the received authentication code received from the user is authenticated by comparing the data with authentication data stored in nonvolatile storage 310, such as a nonvolatile memory that stores centrally managed passwords (CMP). A determination is made as to whether the user is authenticated based on the authentication process (decision 450). If the user is not authenticated, decision 450 branches to "no" branch 455 whereupon the user is not allowed access to the system and the system does not continue booting. In one embodiment, branch 455 loops back one or more times to allow the user to re-try entry of the authentication code.

Figure 5:
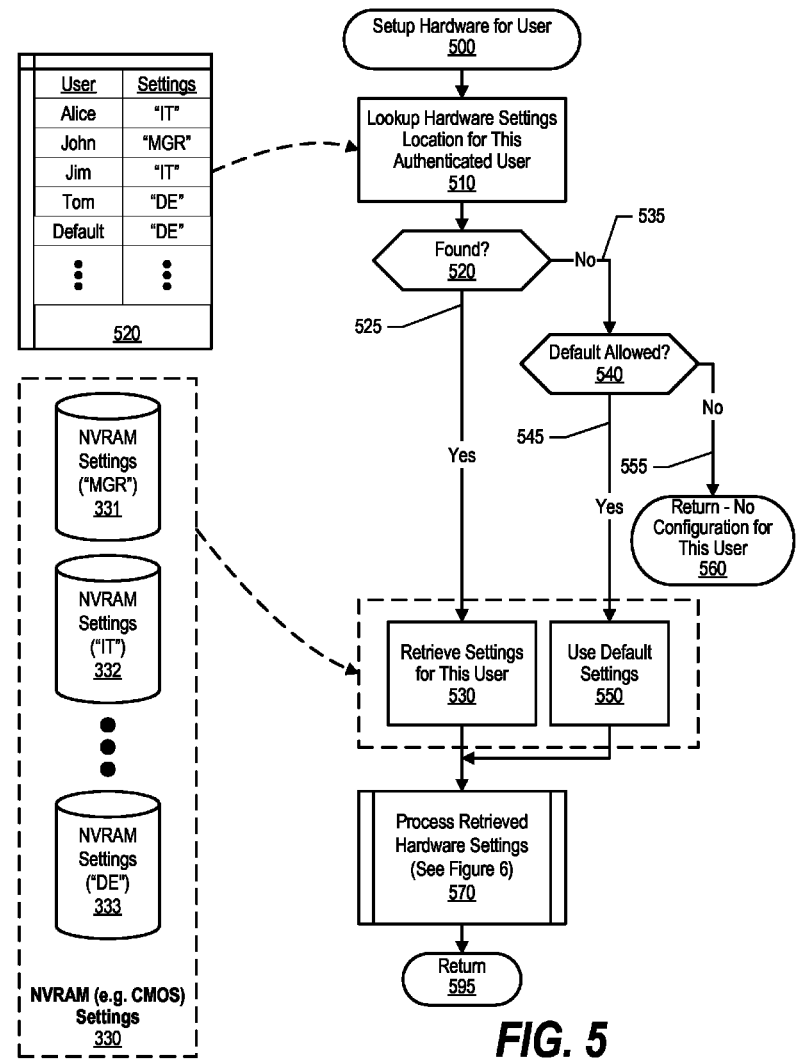
FIG. 5 is a flowchart that shows steps used in configuring hardware devices for a particular user that logs onto the computer system.

On the other hand, if the user is authenticated based on the authentication code provided by the user, then decision 450 branches to "yes" branch 465 whereupon, at predefined process 470, hardware devices, such as ports and drives, are enabled or disabled based on configuration settings that correspond to this user (see FIG. 5 and corresponding text for processing details). A timestamp and user identification data is written to audit log 320. In one embodiment, one or more records are also written to audit log 320 to record which devices were enabled (or disabled) while this user was using the computer system.

In one embodiment, a policy can be established so that only users with configured hardware settings are allowed to use the computer system. If this policy has been established and hardware settings have not been configured for this user, then predefined process 470 branches to branch 475 whereupon processing ends at 480 without booting the computer system and without allowing the user to use the computer system.

If a policy is not established that only users with configured hardware settings to use the computer system or if configured hardware settings exist for this user, then predefined process 470 branches to step 490. At step 490, the user is allowed to use the computer system using the configured hardware settings that enable/disable devices based upon the user's identity. Processing ends at 495 (e.g., when the user restarts the computer so another user's configuration can be established, shuts down the computer system, turns the computer system off, etc.).

FIG. 5 is a flowchart that shows steps used in configuring hardware devices for a particular user that logs onto the computer system. Processing commences at 500 whereupon, at step 510, the process looks up the settings file or location that correspond to the user that has been properly authenticated. As shown, the settings can be configured for individual users as well as grouping users so that each user in a group uses the same configuration settings. For example, if a computer system is used by managers, information technology specialists, and data entry workers, three sets of NVRAM settings can be established (one for each group) and the hardware devices can be configured accordingly. Using the example shown, two users are noted as information technology ("IT") personnel (Alice and Jim), one user (John) is noted as being a manager ("MGR") and one user ("Tom") is noted as being a data entry ("DE") worker. In addition, a default setting has been established so that if a user is not listed in table 520 a default settings file is used. In this case the Default setting uses the same hardware configuration setting file as used by the data entry ("DE") workers. Likewise, settings can be established for individual users rather than grouping the users into various groups.

A determination is made as to whether hardware settings have been established for this user (decision 520). If hardware settings have been established for this user, then decision 520 branches to "yes" branch 525 whereupon, at step 530, the hardware settings established for this user are retrieved from NVRAM (e.g., Secured Flash, EEPROM, etc.) settings 330.

For example, if the user is a manager, the hardware settings are retrieved from settings file 331 and if the user is an IT specialist, then the hardware settings are retrieved from settings file 332.

Returning to decision 520, if hardware settings have not been established for this user, then decision 520 branches to "no" branch 535 whereupon a determination is made as to whether a policy has been established that either allows or does not allow use of a default configuration settings file (decision 540). If default configuration settings are allowed, then decision 540 branches to "yes" branch 545 whereupon, at step 550, a set of default hardware configuration settings (settings file 333) are retrieved from NVRAM settings 330. On the other hand, if default configuration settings are not allowed, then decision 540 branches to "no" branch 555 whereupon processing returns to the calling routine (see FIG. 4) with an error indicating that no configuration settings exist for this user. When this occurs, the system is not booted and the user is unable to user the computer system.

Figure 6:
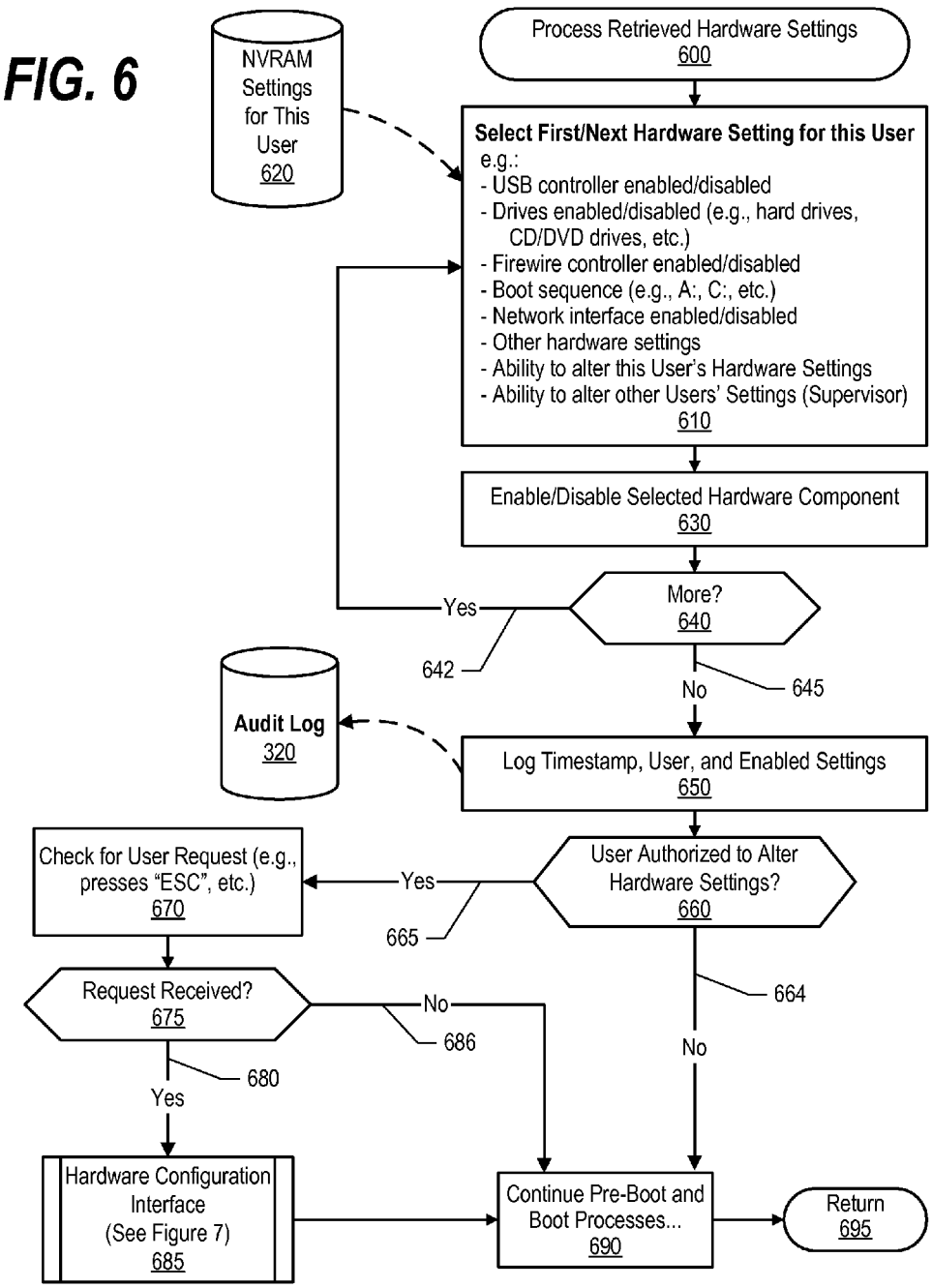
FIG. 6 is a flowchart that shows the processing of the hardware settings retrieved using the steps shown in FIG. 5.

If either (a) hardware configuration settings are found for this user, or (b) default configuration settings are used, then the specific hardware settings are processed using predefined process 570 (see FIG. 6 and corresponding text for processing details). Processing then returns to the calling routine (see FIG. 4) when the steps shown in FIG. 5 are completed.

FIG. 6 is a flowchart that shows the processing of the hardware settings retrieved using the steps shown in FIG. 5. Processing commences at 600 whereupon, at step 610 the first hardware setting is selected from the nonvolatile RAM (NVRAM) settings file 620 that was found for this user as shown in FIG. 5 (i.e., settings file 331, 332, or 333 is used as settings file 620 based on the identity of the user). Hardware settings can include whether a USB controller is enabled or disabled either enabling or disabling use of USB devices, enabling or disabling hardware devices such as hard drives, CD-ROM, DVD drives, or the like. Enabling or disabling a firewire controller. Specification of a boot sequence used by the computer system when this user is using the system (e.g., only boot from a specific hard drive or from a drive loaded with boot software that has a specific signature, allowing boot from external media, etc.). Enabling or disabling a network interface, such as an Ethernet adapter can also be set to enable or disable access and use of a computer network, such as the Internet, from the computer system. In addition, other hardware settings can be set to enable or disable other hardware ports and devices. Hardware settings are also included to indicate whether this user has permission to alter his or her hardware configuration settings as well as settings to indicate whether this user has permission to alter other users' hardware configuration settings (e.g., setting up configuration settings for new users of the system, changing a particular user or a user group's hardware configuration settings, etc.). At step 630, the selected hardware component is enabled or disabled as indicated by the entry in settings file 620.

A determination is made as to whether there are more hardware configuration settings to process for this user (decision 640). If there are more settings to process, then decision 640 branches to "yes" branch 642 which loops back to select the next hardware setting from settings file 620 and enable/disable the hardware component as needed. This looping continues until there are no more settings to process from settings file 620, at which point decision 640 branches to "no" branch 645.

At step 650, the current timestamp is logged in audit log data store 320 along with the user's identification (e.g., username) as well as records that indicate what hardware configuration settings were in place at the time that this user was using the computer system. Audit log 320 can thereafter be viewed to determine which users accessed the computer system at particular times as well as what hardware configuration settings were in place while the user was using the system. In this manner, breaches of security can be better traced by eliminating users that did not have access to ports (e.g., USB ports, etc.) that were used to access and copy sensitive data.

A determination is made as to whether the user is authorized to alter hardware configuration settings (decision 660). If the user is not authorized to alter the hardware configuration settings, then decision 660 branches to "no" branch 664 whereupon, at step 690, the system continues with pre-boot activities and then boots the operating system. Processing then returns to the calling routine (see FIG. 5) at 695.

On the other hand, if the user is authorized to alter hardware configuration settings, then decision 660 branches to "yes" branch 665 whereupon, at step 670, the system checks for a user request to alter the configuration settings. For example, in some systems a particular keystroke (e.g., press of the "Escape" key, etc.) is checked during pre-boot processing to allow the user to alter hardware configuration settings. A determination is made as to whether a request is received from the user requesting to alter hardware configuration settings (decision 675). If a request is received, then decision 675 branches to "yes" branch 680 whereupon, at predefined process 685, a hardware configuration interface is provided (see FIG. 7 and corresponding text for processing details). On the other hand, if a request is not received, then decision 675 branches to "no" branch 686 bypassing predefined process 690. At step 690, the system continues with pre-boot activities and then boots the operating system. Processing then returns to the calling routine (see FIG. 5) at 695.

Figure 7:
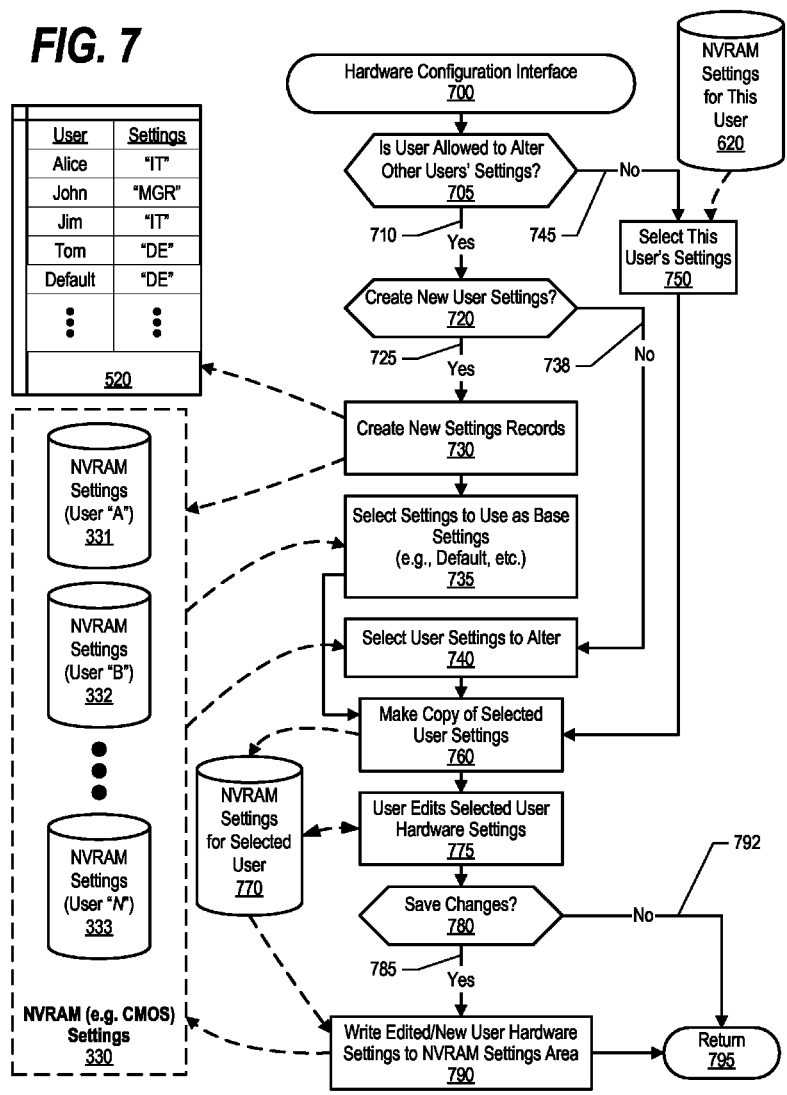
FIG. 7 is a flowchart showing steps taken to configure the hardware configuration settings for the user as well as for other users of the computer system.

FIG. 7 is a flowchart showing steps taken to configure the hardware configuration settings for the user as well as for other users of the computer system. Processing commences at 700 whereupon a determination is made as to whether the user is allowed to alter other users' hardware configuration settings or just allowed to alter the user's own hardware configuration settings (decision 705). If the user is only allowed to alter other users' hardware configuration settings, then decision 705 branches to "yes" branch 710 whereupon a determination is made as to whether the user is creating a new user's settings or altering an existing user's settings. If the user is creating new user settings, then decision 720 branches to "yes" branch whereupon, at step 730, new hardware configuration settings records are creating by adding the new user's identification information into table 520, including the set of hardware configuration settings to associate with the new user (e.g., depending upon whether the new user is a manager, IT specialist, data entry worker, etc.). At step 735, one of the hardware settings files from settings files 330 is selected to use as the base settings for this user (e.g., by selecting the "default" settings file).

Returning to decision 720, if the user is altering an existing user, or set of users, settings, then decision 720 branches to "no" branch 738 whereupon, at step 740, the user selects the hardware configuration settings file (e.g., file 331, 332, or 333, etc.) from NVRAM settings area 330. Returning to decision 705, if the user is not authorized to alter other user's settings, then decision 705 branches to "no" branch 745 whereupon, at step 750, the user's own settings (settings file 620 identified using the steps shown in FIG. 6) is selected.

After a hardware settings file has been selected (either an existing file being altered or used as a base for a new settings file), then, at step 760, a copy is made of the selected user settings file and stored in selected user hardware configuration settings file 770. At step 775, the user edits settings file 770 (e.g., using a user interface to enable/disable particular ports and hardware devices, establish a boot sequence, etc.). A determination is made as to whether the user wishes to save or abandon (cancel) the changes that were made (decision 780). If the user wishes to save the changes, then decision 780 branches to "yes" branch 785 whereupon, at step 790, the edited settings stored in settings file 770 are written to the nonvolatile memory (NVRAM 330). In one embodiment, the nonvolatile memory is "flashed" to copy the edited file to the nonvolatile memory. On the other hand, if the user wishes to cancel the editing of the hardware configuration settings, then decision 780 branches to "no" branch 792 bypassing step 790. Processing then returns to the calling routine (see FIG. 8) at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method executed by an information handling system, the method comprising:
receiving a user identifier from a user of the information handling system;
determining, at least in part using the user identifier, whether one or more hardware settings that correspond to the user identifier have been established;
responsive to a determination that one or more hardware settings that correspond to the user identifier have been established, configuring one or more hardware devices based on the one or more hardware settings;
responsive to a determination that one or more hardware settings that correspond to the user identifier have not been established, determining whether establishing default hardware settings has been enabled;
responsive to a determination that establishing default hardware settings has been enabled, configuring one or more hardware devices based on the one or more default hardware settings; and
responsive to a determination that establishing default hardware settings has not been enabled and one or more default hardware settings exist, not configuring one or more hardware devices based on the one or more default hardware settings.

2. The method of claim 1, wherein at least one of the hardware devices is a port used to communicate with the information handling system from one or more external devices.

3. The method of claim 1, comprising:
receiving a user request to change one or more of the hardware settings prior to booting an operating system of the information handling system;
determining whether the user is authorized to change one or more of the hardware settings; and
changing one or more of the hardware settings corresponding to the user request at least in part based on input received through a hardware configuration interface presented prior to booting the operating system, the changing being done in response to determining that the user is authorized to change one or more of the hardware settings; and
booting the operating system after the configuring of the hardware devices.

4. The method of claim 1, wherein the user identifier includes an authentication code and the method further comprises:
comparing the received user identifier, including the received authentication code with one or more centrally managed authentication codes stored on a second nonvolatile memory.

5. The method of claim 1 further comprising:
writing a timestamp and the received user identifier to an audit log that is stored on a nonvolatile storage device.

6. The method of claim 5 further comprising:
writing one or more hardware configuration records that reflect the configuration status of the hardware devices to the audit log; and
encrypting the audit log.

7. The method of claim 1 further comprising:
reading an authorization indicator corresponding to the identified user, the reading performed before the booting;
receiving a request from the user to alter one or more hardware settings that correspond to other users of the information handling system;
in response to receiving the request, determining whether the user is authorized to alter the hardware settings of other users based upon the authorization indicator;
allowing the user to alter the hardware settings that correspond to other users in response to the authorization indicator granting the user such authorization; and denying the user the ability to alter the hardware settings that correspond to other users in response to the authorization indicator not granting the user such authorization.

8. The method of claim 1 wherein the hardware devices include a Universal Serial Bus (USB) controller, a hard drive controller, a network interface device, and a device boot sequence setting.

9. An information handling system comprising:
one or more processors;
at least one memory accessible by at least one of the processors; and
at least one set of instructions which are loaded into memory and executed by at least one of the processors to:
receive a user identifier from a user;
responsive to a determination that one or more hardware settings that correspond to the user identifier have been established, configure one or more hardware devices based on the one or more hardware settings;
responsive to a determination that one or more hardware settings that correspond to the user identifier have not been established, determine whether establishing default hardware settings has been enabled;
responsive to a determination that establishing default hardware settings has been enabled, configure one or more hardware devices based on the one or more default hardware settings; and
responsive to a determination that establishing default hardware settings has not been enabled despite one or more default hardware settings existing, not configure one or more hardware devices based on the one or more default hardware settings.

10. The system of claim 9, wherein the instructions cause the processor executing the instructions to:
retrieve, from a first area of a nonvolatile memory device accessible to the processor, one or more hardware settings that correspond to the received identifier;
configure one or more hardware devices based on the retrieved hardware settings, wherein at least one of the hardware devices is a port controller;
receive a user request to change one or more of the hardware settings prior to booting an operating system of the information handling system;
determine whether the user is authorized to change one or more of the hardware settings;
change one or more of the hardware settings corresponding to the user request at least in part based on input received through a hardware configuration interface presented prior to booting the operating system, the changing being done in response to determining that the user is authorized to change one or more of the hardware settings; and
booting the operating system after the configuring of the hardware devices.

11. The information handling system of claim 10 wherein the user identifier includes an authentication code and wherein the instructions executed by at least one of the processors perform additional actions comprising:
comparing the received user identifier, including the received authentication code with one or more centrally managed authentication codes stored on a second area of the nonvolatile memory.

12. The information handling system of claim 10 wherein the instructions executed by at least one of the processors perform additional actions comprising:
writing a timestamp and the received user identifier to an audit log that stored in a nonvolatile storage location, the nonvolatile storage location selected from the nonvolatile memory and a nonvolatile storage device accessible to the processor.

13. The information handling system of claim 12 wherein the instructions executed by at least one of the processors perform additional actions comprising:
writing one or more hardware configuration records that reflect the configuration status of the hardware devices to the audit log; and
encrypting the audit log.

14. The information handling system of claim 9 wherein the instructions executed by at least one of the processors perform additional actions comprising:
reading an authorization indicator corresponding to the identified user, the reading performed before the booting;
receiving, at a user input device, a request from the user to alter one or more hardware settings that correspond to other users of the information handling system;
in response to receiving the request at the user input device, determining whether the user is authorized to alter the hardware settings of other users based upon the authorization indicator;
allowing the user to alter the hardware settings that correspond to other users in response to the authorization indicator granting the user such authorization; and
denying the user the ability to alter the hardware settings that correspond to other users in response to the authorization indicator not granting the user such authorization.

15. The information handling system of claim 9 wherein the hardware devices include a Universal Serial Bus (USB) controller, a hard drive controller, a network interface device, and a device boot sequence setting.

16. A computer program product stored in a non-transitory computer readable medium, comprising computer readable code that, when executed by an information handling system, causes the information handling system to perform actions that include:
receiving a user identifier from a user of the information handling system;
determining, at least in part using the user identifier, whether one or more hardware settings that correspond to the user identifier have been established;
responsive to a determination that one or more hardware settings that correspond to the user identifier have been established, configuring one or more hardware devices based on the one or more hardware settings;
responsive to a determination that one or more hardware settings that correspond to the user identifier have not been established, determining whether establishing default hardware settings has been enabled;
responsive to a determination that establishing default hardware settings has been enabled, configuring one or more hardware devices based on the one or more default hardware settings; and
responsive to a determination that establishing default hardware settings has not been enabled despite one or more default hardware settings existing, not configuring one or more hardware devices based on the one or more default hardware settings.

17. The computer program product of claim 16, wherein the instructions when executed by the system cause the system to execute acts including:

retrieving, from a nonvolatile memory accessible by the information handling system, one or more hardware settings that correspond to the received identifier;

configuring one or more hardware devices based on the retrieved hardware settings, wherein at least one of the hardware devices is a port used to communicate with the information handling system from one or more external devices;

receiving a user request to change one or more of the hardware settings prior to booting an operating system of the information handling system;

determining whether the user is authorized to change one or more of the hardware settings; and changing one or more of the hardware settings corresponding to the user request at least in part based on input received through a hardware configuration interface presented prior to booting the operating system, the changing being done in response to determining that the user is authorized to change one or more of the hardware settings; and booting the operating system after the configuring of the hardware devices.

18. The computer program product of claim 16 wherein the user identifier includes an authentication code and wherein the instructions when executed by the system cause the system to execute acts including:

comparing the received user identifier, including the received authentication code with one or more centrally managed authentication codes stored on a second nonvolatile memory.

19. The computer program product of claim 18 wherein the instructions when executed by the system cause the system to execute acts including:

writing a timestamp and the received user identifier to an audit log that is stored on a nonvolatile storage device;

writing one or more hardware configuration records that reflect the configuration status of the hardware devices to the audit log; and encrypting the audit log.

20. The computer program product of claim 16 wherein the instructions when executed by the system cause the system to execute acts including:

reading an authorization indicator corresponding to the identified user, the reading performed before the booting;

receiving a request from the user to alter one or more hardware settings that correspond to other users of the information handling system;

in response to receiving the request, determining whether the user is authorized to alter the hardware settings of other users based upon the authorization indicator;

allowing the user to alter the hardware settings that correspond to other users in response to the authorization indicator granting the user such authorization; and denying the user the ability to alter the hardware settings that correspond to other users in response to the authorization indicator not granting the user such authorization.

21. The computer program product of claim 16 wherein the hardware devices include a Universal Serial Bus (USB) controller, a hard drive controller, a network interface device, and a device boot sequence setting.

* * * * *